United States Patent
Mundl et al.

Patent Number: 6,126,426
Date of Patent: Oct. 3, 2000

[54] VULCANIZATION MOLD FOR MANUFACTURING PNEUMATIC VEHICLE TIRES COMPRISING SEGMENTS FOR FORMING THE TIRE TREAD HAVING A HONEYCOMB LAMELLA PATTERN AND PNEUMATIC VEHICLE TIRE MANUFACTURED IN SUCH A MOLD

[75] Inventors: Reinhard Mundl, Hannover; Helmut Rodewald, Hohenhameln, both of Germany

[73] Assignee: Continental Aktiengesellschaft, Germany

[21] Appl. No.: 09/359,992

[22] Filed: Jul. 22, 1999

[30] Foreign Application Priority Data

Jul. 22, 1998 [DE] Germany .............. 198 32 931

[51] Int. Cl.$^7$ ................................... B29C 35/02
[52] U.S. Cl. .................. 425/28.1; 425/35; 425/46
[58] Field of Search .................. 425/28.1, 35, 46

[56] References Cited

U.S. PATENT DOCUMENTS

| | | | |
|---|---|---|---|
| 5,247,151 | 9/1993 | Hagerman | 219/69.17 |
| 6,026,875 | 2/2000 | Diensthuber et al. | 152/209.2 |

FOREIGN PATENT DOCUMENTS 0 691 222 of 0000 European Pat. Off. .
192 12 829 of 0000 Germany .

*Primary Examiner*—Harold Pyon
*Assistant Examiner*—Donald H. Heckenberg
*Attorney, Agent, or Firm*—Robert W. Becker & Associates

[57] ABSTRACT

A vulcanization mold for manufacturing pneumatic vehicle tires has mold segments for forming the tread strip of a pneumatic vehicle tire. The mold segments have a radially inwardly facing honeycomb lamella pattern in a radial direction of the vulcanization mold. The honeycomb lamella pattern has first zigzag lamella members mounted in the mold segments and second zigzag lamella members mounted in the mold segments. The first zigzag lamella members extend in a first main direction and the second zigzag members extend in a second main direction. The first and second main directions cross one another. The first zigzag lamella members have first lamella elements and the second zigzag lamella members have second lamella elements, wherein the first and second lamella elements form honeycomb walls of the honeycomb pattern. Some honeycomb walls are joined walls each comprising one of the first lamella elements as a base portion and one of the second lamella elements as a bridge portion arranged in a radial direction of the vulcanization mold atop one another.

11 Claims, 2 Drawing Sheets

VULCANIZATION MOLD FOR MANUFACTURING PNEUMATIC VEHICLE TIRES COMPRISING SEGMENTS FOR FORMING THE TIRE TREAD HAVING A HONEYCOMB LAMELLA PATTERN AND PNEUMATIC VEHICLE TIRE MANUFACTURED IN SUCH A MOLD

BACKGROUND OF THE INVENTION

The present invention relates to a vulcanization mold for manufacturing pneumatic vehicle tires comprising mold segments for forming the tire tread having, in a plan view onto the radially inwardly positioned mold surface, a honeycomb lamella pattern of a first set of zigzag lamella members, arranged in an at least substantially coinciding direction of extension.

Tread strip patterns for snow tires conventionally have a plurality of narrow sipes. As is well known in the art, the type and manner of the sipe arrangement and design within the individual profiled elements, for example, tread blocks, provides a means of directly effect of the bending stiffness of such profiled elements, especially for optimizing traction and braking properties. An especially advantageous possibility of affecting the bending stiffness is suggested in European Patent application 0 691 222 A2. According to this disclosure, the sipes in the individual profiled elements of the treads strip pattern are provided as a network of uniform or substantially uniform hexagons.

For producing such sipe patterns in the tread strip of a pneumatic vehicle tire, the mold segments of the vulcanization mold, which are to form the correspondingly shaped profiled elements in the tread, must be provided with a honeycomb lamella pattern.

German patent application 196 12 829 A1 discloses a vulcanization mold of the aforementioned kind and suggests, for the formation of a honeycomb pattern of lamellas, to provide a set of zigzag main lamella members anchored within the mold segments and having a main direction of extension so that they are substantially parallel to one another. Two neighboring main lamella members are arranged axis-symmetrically relative to a symmetry axis which extends parallel to the main direction of extension.

For completing the honeycomb structure, straight auxiliary lamellas are anchored within the mold segment. They are connected to the facing corners of neighboring main lamella members and extend perpendicularly to the axis of symmetry. These straight auxiliary lamellas which provide a single honeycomb wall can then be subsequently anchored within the segment or can be positive-lockingly connected to the corners of the zigzag main lamella members.

It was found that this known solution has the disadvantage that the straight auxiliary lamellas are weak points of the honeycomb structure which, especially when they are only anchored to the mold segment, are not sufficiently stable, especially during the actual molding process during which they can be easily bent. The stiffer form-locking connection of the auxiliary lamellas to the corners of the main lamella members, as is suggested by German Patent application DE 196 12 829 A1, requires a time consuming and difficult manipulation because the auxiliary lamellas must be inserted with projections into slots at the corners of the zigzag main lamella members.

The invention has the object to provide a vulcanization mold with mold segments having a honeycomb lamella pattern that is to be constructed of a small number of individual parts but should be very stiff. It is especially an object of the invention to reduce the number of individual parts relative to the known solution of DE 196 12 829 A1.

SUMMARY OF THE INVENTION

This object is inventively solved in that in the mold segment second lamella members, that are also zigzag-shaped or extend in a zigzag pattern, are arranged in a cross arrangement to the first zigzag lamella members. The first zigzag lamella members have substantially an identical main direction of extension, while the second zigzag lamella members also have a substantially identical main direction of extension. Some walls of the honeycombs of the honeycomb pattern are jointly formed by lamella elements of the first and second lamella members so as to form a joined wall.

The hexagon honeycomb lamella pattern is thus inventively constructed of two types of lamella members. In order to allow this, the lamella members are designed such that individual walls of the honeycomb pattern are comprised of lamella elements of two different lamella members.

This solution eliminates individual free standing lamella members which in the aforementioned prior art solution are provided as connecting or auxiliary lamella members. Thus, a complicated, time-consuming manipulation of such auxiliary lamella members is no longer required. The inventive solution provides a honeycomb lamella pattern that is very stiff.

The stability of the lamella pattern, with regard to molding, i.e., introduction into and removal from the tire tread strip, is improved when each lamella member has lamella elements which by themselves form a wall of the honeycomb and which alternate with such lamella elements, which form a joined wall together with lamella elements of the crossing lamella member.

In a preferred embodiment it is suggested that the first lamella members have lamella elements that are base portions which form at least the base portion of the honeycomb wall. With this design it is possible in a very simple manner to provide a raised bottom of the sipes formed by the base portions.

For completing the joined wall, the crossing second lamella members have bridge or top portions which rest on the base portions of the lamella elements of the first lamella members.

In a balanced embodiment with regard to stability, within a respective type of lamella member the lamella elements which form a complete honeycomb wall alternate with lamella elements which form either a base portion or a bridge portion of the respective joined wall.

In order to be able to withstand the forces acting on the lamella pattern during molding, i.e., insertion or removal from the tread strip, the vulcanization mold is designed such that either the base portion or the lamella element forming a complete honeycomb wall or both are provided with mounting tabs for anchoring within the mold segment.

According to a beneficial embodiment with regard to ease of manufacture and with regard to improved stability, the connecting line between the bridge portion and the base portion extends substantially parallel to the radially inwardly facing surface of the mold segment.

In a preferred embodiment of the invention, the design and type of connection of the crossing lamella members is such that two walls of each complete honeycomb are formed by lamella elements of the first lamella members and by lamella elements of the second lamella members.

According to one particular embodiment of the invention it is suggested that walls formed by lamella elements of one single lamella member are incomplete walls.

With a respective design of the lamella members, as mentioned before, it is possible to provide sipes in the tire tread with raised bottom. For the resulting network in the tire tread it is advantageous when such sipes are oriented in the circumferential direction of the tread pattern. This can be accomplished easily in that the lamella members which have partial lamella elements that are primarily base portions are anchored within the mold segment such that they are direction of extension is substantially in the circumferential direction of the vulcanization mold, respectively, of the tire to be molded.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 6.

The present invention will now be described in detail with the aid of several specific embodiments utilizing FIGS. 1 through 6.

Figure 1:
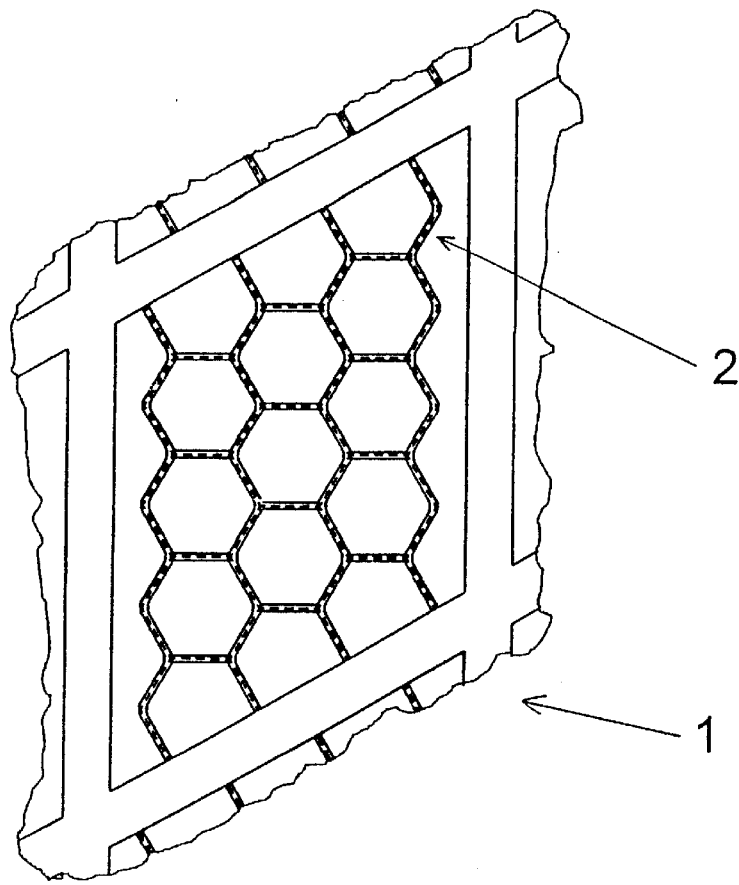
FIG. 1 shows a plan view onto a mold segment of a tire vulcanization mold for forming the tread pattern of a pneumatic vehicle tire.

FIG. 1 shows a plan view onto the radially inwardly facing surface of a mold segment I of a vulcanization mold whereby the represented portion is provided for molding a tread block of a tire. For providing a network of sipes, in which the sipes extending in a hexagon pattern, a honeycomb lamella pattern 2 is provided. In the shown embodiment it is illustrated that the sipe network to be formed is comprised of uniform hexagons so that the lamella pattern 2 is comprised of uniform honeycombs having six corners. In an alternative embodiment, the sipe network can also be comprised of hexagons which are irregular, for example, have a slightly elongate extension in one direction. In this case, the honeycomb structure of the lamella pattern 2 would have to be adapted to such a design.

In the embodiment represented in FIG. 1, the lamella pattern 2 will produce in the tire tread block of plurality of rows of sipes extending along the sides of a hexagon.

Figure 2:
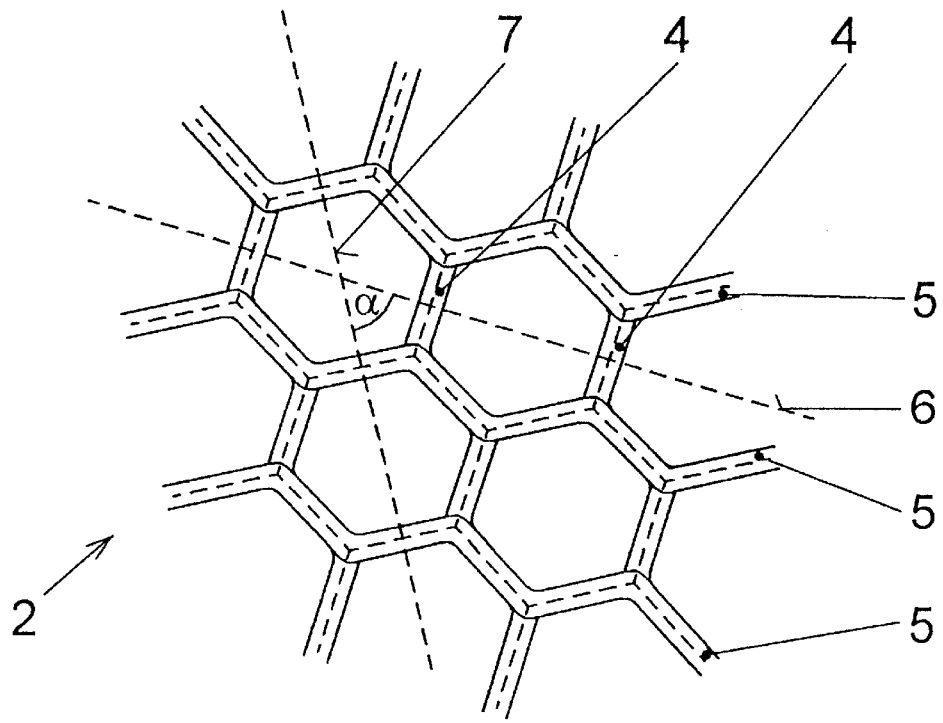
FIG. 2 shows a greatly enlarged view of the honeycomb lamella pattern of FIG. 1.

FIG. 2 shows also that the honeycomb lamella pattern 2 is comprised inventively of two sets of lamella members 4, 5. Within one set of lamella members 4 or 5, the same main direction of extension is provided. As can be seen especially in FIG. 2 and FIG. 3, the lamella members 4 or 5, have a zigzag shape. The dashed straight line 7 indicates the main direction of extension of the lamella members 4 whereby this straight line extends at an angle a of 60°, respectively, approximately 60°, to the dashed straight line 6 that represents the main direction of extension of the lamella members 5. Two neighboring lamella members 4 or lamella members 5 are positioned axis-symmetrical to one another so that the represented straight lines 6, 7 also represents an axis of symmetry, respectively.

The design of the lamella members 4, 5 for forming a honeycomb lamella pattern 2, their cooperation, and their manufacture will be explained in more detail with the aid of FIGS. 3 through 6.

Figure 3:
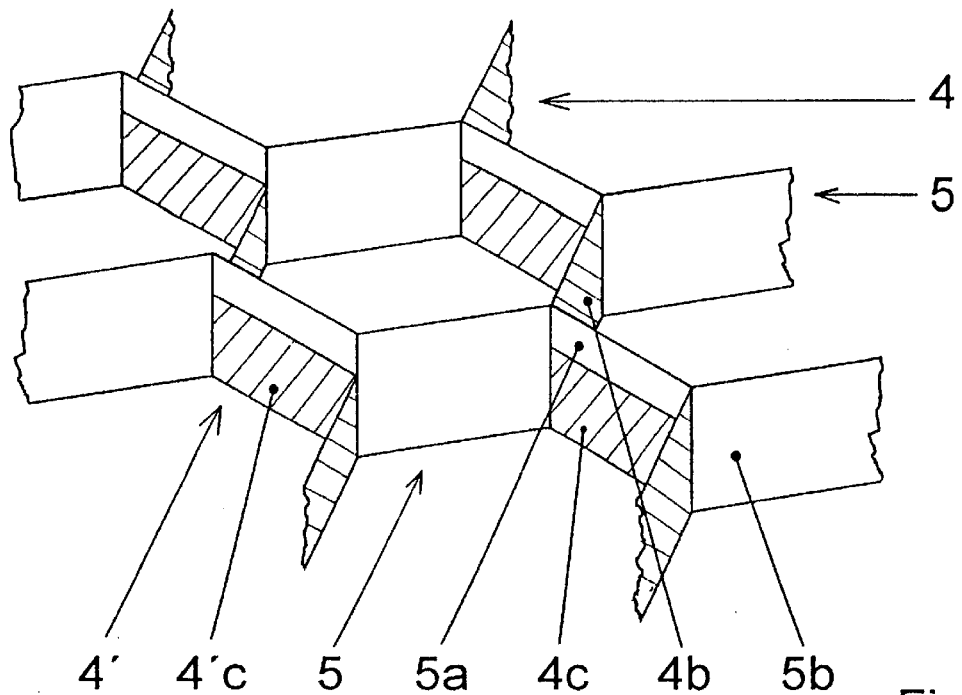
FIG. 3 shows a perspective view of a portion of the honeycomb lamella pattern of FIG. 2, whereby two embodiments of the invention are represented.

FIG. 3 shows a perspective view of a portion of the lamella pattern of FIG. 1 and FIG. 2 whereby only the areas of the lamella members 4, 5 are represented which project from the surface of the mold segment, i.e., the portions with which the lamella members 4, 5 are anchored or mounted within the mold segment are not represented. For facilitating understanding of the invention, FIG. 3 shows the lamella members of the same type with cross hatching.

The first type of lamella members is shown in FIG. 3 in two embodiments 4 and 4'. The second type of lamella members 5 which cross the first lamella members 4, 4' in FIG. 3 are of identical construction.

The represented zigzag lamella member 4 is comprised alternatingly of lamella elements 4c forming base portions and complete lamella elements 4b. In the shown embodiment, the radial height of the base portion (lamella element) 4c is approximately two third of the radial height of the complete lamella element 4b having a radial height that corresponds to the desired depth of the sipes to be produced. Two axis-symmetrically extending lamella members 4 thus form, the base portion 4c only partly, four walls of a complete hexagon of the lamella pattern 2.

The lamella members 5 also have a zigzag design and are comprised alternatingly of complete lamella elements 5b and lamella elements 5a that provide bridge portions. The complete lamella elements 5b have the same radial height as the complete lamella elements 4b, while the bridge portions 5a complete the base portions 4c to form a joined wall of the honeycomb. The honeycomb lamella pattern 2 results from placement of the lamella members 5 onto the lamella members 4 such that the end faces of the bridge portions 5a rest on the end faces of the base portions 4c. The design is preferably such that the connecting or joining lines extend parallel to the surface of the mold segment. The connecting lines, based on a respective embodiment of the lamella elements 4c, 5a can also be designed in any other way, for example, can have a slanted extension.

According to a second embodiment, differently designed lamella members 4' are provided which are designed such that they are essentially comprised only of the base portions 4'c of reduced radial height. All of the base portions 4'c, as shown in FIG. 3, can have identical radial height which, in the represented embodiment, is approximately two thirds of the height of the complete lamella element 5b. In the finished tire, sipes are thus produced within the tread block which form the respective borders of the hexagon structure (honeycomb), but extend only to approximately two thirds of the depth of the sipes formed by the complete lamella element 5b in the tread block.

Figure 4:
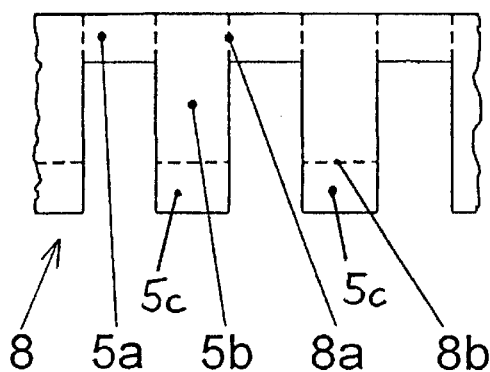
FIG. 4 shows a view of a stamped sheet metal strip for producing a lamella member for forming the inventive honeycomb lamella pattern according to FIGS. 1 through 3.

FIG. 4 shows a front view of a portion of the sheet material strip 8 for forming the lamella member 5. For producing the lamella member 5, the stamped sheet metal strip 8 is bent along the dashed line 8a shown in FIG. 4 by a suitable tool. The line 8b indicates the separation line to the areas (mounting tabs 5c) of the sheet metal strip 8 which are anchored in the vulcanization mold. These mounting tabs 5c are provided at the foot area of the complete lamella elements 5b which are connected by the bridge portions 5a.

Figure 5:
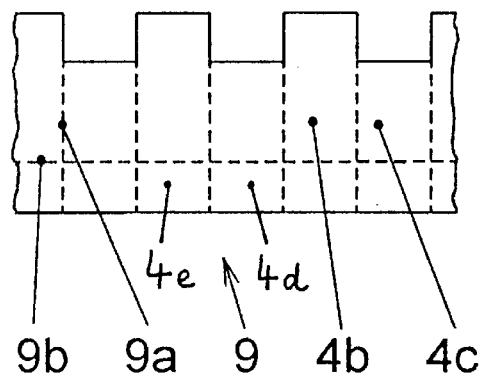
FIG. 5 shows the other lamella member for forming the inventive honeycomb lamella pattern according to FIGS. 1 through 3.
Figure 6:
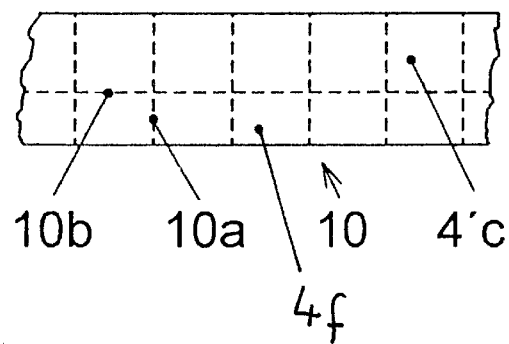
FIG. 6 shows a variation of the lamella member of FIG. 5.

The FIGS. 5 and 6 show portions of the sheet metal strip 9 and 10 for producing the lamella members 4, 4'. As shown in FIG. 5, the sheet metal strip 9 is stamped such that alternatingly based portions 4c and complete lamella elements 4b are provided when the sheet metal strip 9 is bent along the lines 9a. The line 9b indicates again the separation line to the mounting tabs (4d, 4e) of the lamella member 4 which are to be anchored within the mold segment. The anchoring portions (mounting tabs) 4d, 4e can be provided across the entire length of the sheet metal strip 9.

FIG. 6 shows a sheet metal strip 10 suitable for producing a lamella member 4'. This figure shows the identical radial height of the lamella elements 4'c to be used as a base portion as well as the intermediate honeycomb wall. The lines 10a indicate the bending line for producing the zigzag design of the lamella member 4' while the dashed line 10b shows the separating line to the mounting tabs 4f.

As mentioned before, the design of the lamella members, as shown in regard to lamella member 4' in FIG. 3, provides the possibility of providing sipe areas with raised bottom. It is advantageous with regard to the resulting sipe network when such sipes are arranged in the circumferential direction of the tire tread pattern, while sipes which have the full depth should be oriented in a direction transverse to the circumferential direction. Such a design can be easily realized by a corresponding arrangements of the lamella members in the mold segment. Of course, within the lamella pattern lamella members of different design can be combined with one another whereby the design can also vary within an individual lamella member.

It is especially advantageous with regard to the present invention that the honeycomb lamella pattern, for producing sipes within the tread block that extend along the sides of a hexagon, can be produced with relatively few parts and that, moreover, the overlapping and insertable arrangement of lamella members provides a very high deformation stability.

The represented embodiments show the basic principle of the invention. Adaptations and modifications, for example, with regard to the depth of the sipes to be produced, can be easily accomplished. For example, with the inventive lamella pattern the selection of radial levels of the connecting lines between the base portions 4c, 4'c of the lamella members 4, 4' and the bridge portions 5a of the lamella members 5 can be used as a means of directly influencing the load bearing stability and bending stiffness of the entire construction. A plurality of variations and possibilities can be envisioned while maintaining the aforementioned load bearing stability and deformation resistance. In addition to the represented embodiment of the lamella members with a zigzag design, it is also possible to provide two sets of lamella members, including, as disclosed, a first set of zigzag lamella members and a second set of lamella members that extend parallel to one another in a zigzag pattern with three consecutive sides of a hexagon as a repeating unit parallel to one another with lamella members, whereby the first and second sets are arranged such the crossing angle of the main direction of extension of the two sets of lamella members is 90°, respectively, approximately 90°.

The specification incorporates by reference the disclosure of German priority document 198 32 931.8 of Jul. 22, 1998.

The present invention is, of course, in no way restricted to the specific disclosure of the specification and drawings, but also encompasses any modifications within the scope of the appended claims.

What is claimed is:

1. A vulcanization mold for manufacturing pneumatic vehicle tires, said vulcanization mold comprising:

mold segments (1) for forming the tread strip of a pneumatic vehicle tire;

said mold segments (1) having a radially inwardly facing honeycomb lamella pattern (2) in a radial direction of said vulcanization mold;

said honeycomb lamella pattern (2) comprised of first zigzag lamella members (4, 4') mounted in said mold segments (1) and second zigzag lamella members (5) mounted in said mold segments (1);

said first zigzag lamella members (4, 4') extending in a first main direction and said second zigzag members (5) extending in a second main direction, wherein said first and said second main directions cross one another;

said first zigzag lamella members (4, 4') comprising first lamella elements (4c, 4'c) and said second zigzag lamella members (5) comprising second lamella elements (5a), wherein said first and second lamella elements form first honeycomb walls of said honeycomb lamella pattern;

wherein said first honeycomb walls are joined walls (4c, 4'c, 5a) each comprised of one of said first lamella elements (4c, 4'c) and one of said second lamella elements (5a) arranged in a radial direction of said vulcanization mold atop one another to form a base portion and a top portion of said joined walls.

2. A vulcanization mold according to claim 1, wherein said first lamella members (4, 4') comprise third lamella elements (4b) and said second lamella members (5) comprise fourth lamella elements (5b), wherein said third and fourth lamella elements (4b, 5b) each form second ones of said honeycomb walls, wherein said first and third lamella elements (4b, 4c, 4'c) alternate in said first lamella members (4, 4') and said second and fourth lamella elements (5b, 5c) alternate in said second lamella elements (5).

3. A vulcanization mold according to claim 2, wherein said first (4c, 4'c), third (4b), and fourth (5b) lamella elements have mounting tabs (4d, 4e, 4f, 5c).

4. A vulcanization mold according to claim 2, wherein said third (4'c, 4b) and fourth (5b) lamella elements have mounting tabs (4e, 4f, 5c).

5. A vulcanization mold according to claim 1, wherein said first lamella elements (4c, 4'c) have mounting tabs (4d, 4f).

6. A vulcanization mold according to claim 1, wherein said first lamella members (4, 4') comprise third lamella elements (4'c), wherein said first and third lamella elements (4c, 4'c) are identical such that said third lamella elements (4'c) form a honeycomb wall having a radial height that is smaller than a radial height of said joined walls.

7. A vulcanization mold according to claim 6, wherein said first and third lamella elements (4c, 4'c) alternate.

8. A vulcanization mold according to claim 1, wherein said top portions (5a) are seated on said bottom portions (4c, 4'c).

9. A vulcanization mold according to claim 1, wherein a connecting line between said top portion (4c, 4'c) and said base portion (5a) extends substantially parallel to a radially inwardly facing surface of said mold segment (1).

10. A vulcanization mold according to claim 1, wherein said first zigzag lamella members (4) are mounted substantially in a circumferential direction of said vulcanization mold.

11. A vulcanization mold according to claim 1, wherein said first lamella members (4, 4') comprise third lamella elements (4*b*) and said second lamella members (5) comprise fourth lamella elements (5*b*), wherein said third and fourth lamella elements (4*b*, 5*b*) each form second ones of said honeycomb walls and wherein some honeycombs of said honeycomb lamella pattern are formed only by said second honeycomb walls.

* * * * *